(12) United States Patent
Schiek

(10) Patent No.: US 9,461,524 B2
(45) Date of Patent: Oct. 4, 2016

(54) ELECTRIC MACHINE

(71) Applicant: Dr. Ing. h.c. F. Porsche Aktiengesellschaft, Stuttgart (DE)

(72) Inventor: Werner Schiek, Jettingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 217 days.

(21) Appl. No.: 14/135,817

(22) Filed: Dec. 20, 2013

(65) Prior Publication Data

US 2015/0180312 A1 Jun. 25, 2015

(30) Foreign Application Priority Data

Dec. 21, 2012 (DE) .................. 10 2012 112 892

(51) Int. Cl.
*H02K 9/06* (2006.01)
*H02K 5/20* (2006.01)
*H02K 9/19* (2006.01)

(52) U.S. Cl.
CPC ........ *H02K 9/06* (2013.01); *H02K 5/20* (2013.01); *H02K 11/21* (2016.01); *H02K 9/19* (2013.01)

(58) Field of Classification Search
CPC ................................ F01P 1/06; H02K 11/015
USPC ......................................................... 310/63
See application file for complete search history.

(56) References Cited

U.S. PATENT DOCUMENTS

| 7,362,016 | B2 | 4/2008 | Cheng | |
|---|---|---|---|---|
| 2004/0108775 | A1* | 6/2004 | Bilsing | H02K 9/06 310/58 |
| 2007/0046111 | A1 | 3/2007 | Lagier et al. | |
| 2007/0210661 | A1* | 9/2007 | Schmidt | H02K 5/06 310/90 |
| 2009/0091137 | A1 | 4/2009 | Nishida et al. | |
| 2011/0001400 | A1* | 1/2011 | Chiba | B60K 6/40 310/67 R |
| 2011/0100253 | A1* | 5/2011 | Koyama | F04D 25/105 105/34.1 |
| 2012/0020703 | A1* | 1/2012 | Matsuzaki | G03G 15/0886 399/258 |
| 2012/0212086 | A1* | 8/2012 | Nagayama | H02K 11/0021 310/59 |

FOREIGN PATENT DOCUMENTS

| DE | 31 09 621 A1 | 9/1982 | | |
|---|---|---|---|---|
| DE | 295 14 026 | 11/1995 | | |
| DE | 102 43 273 | 5/2004 | | |
| DE | 10 2005 053 548 | 5/2007 | | |
| DE | 20 2008 015 602 | 2/2009 | | |
| DE | 10 2011 012 357 | 8/2012 | | |
| JP | 63259194 | * | 10/1988 | ............. F04D 29/22 |
| JP | 2002-010574 | 1/2002 | | |
| WO | 2006/137498 | 12/2006 | | |

OTHER PUBLICATIONS

German Patent Appl. No. 10 2012 112 892.8—Search Report issued Aug. 5, 2015.

* cited by examiner

*Primary Examiner* — Terrance Kenerly
(74) *Attorney, Agent, or Firm* — Gerald E. Hespos; Michael J. Porco; Matthew T. Hespos

(57) ABSTRACT

The invention relates to an electric machine supplied with air for cooling purposes. The air is heated during operation of the electric machine and is removed in the form of exhaust air. The electric machine is equipped with a fan wheel (70) which is coupled to a rotor of the electric machine. To improve and to simplify the operation of the electric machine, the fan wheel (70) is designed as a precise steel part with a sensor device (71) for detecting a rotational speed of the fan wheel (50; 70) and thereby detecting a rotational speed of the rotor.

7 Claims, 4 Drawing Sheets

ELECTRIC MACHINE

CROSS REFERENCE TO RELATED APPLICATION

This application claims priority under 35 USC 119 to German Patent Appl. No. 10 2012 112 892.8 filed on Dec. 21, 2012, the entire disclosure of which is incorporated herein by reference.

BACKGROUND

1. Field of the Invention

The invention relates to an electric machine that is supplied with air for cooling purposes. The air is heated during operation of the electric machine and is removed in the form of exhaust air. The electric machine has a fan wheel coupled to a rotor of the electric machine. The invention also relates to a motor vehicle with such an electric machine and to a method for operating an electric machine.

2. Description of the Related Art

U.S. Pat. No. 7,362,016 discloses an electric motor with a cooling means and suitable sensors. US Patent Application Pub. No. US 2007/0046111 A1 discloses an electric motor with a ventilation device. German laid-open application DE 31 09 621 A1 discloses a multi-phase A.C. motor with a rotational speed sensor consisting of a disk-shaped transmitter and a receiver. The disk-shaped transmitter is fastened to the hub.

It is the object of the invention to improve and/or to simplify the operation of an electric machine that is supplied with air for cooling purposes, where the air that is heated during operation of the electric machine and is removed in the form of exhaust air, and that has a fan wheel coupled to a rotor of the electric machine.

SUMMARY OF THE INVENTION

The object is achieved by an electric machine that is supplied with air for cooling purposes. The air is heated during operation of the electric machine and is removed in the form of exhaust air. The electric machine is equipped with a fan wheel that is coupled to a rotor of the electric machine. The fan wheel is designed as a precise metal part, in particular steel part. This design of the fan wheel affords the advantage that the fan wheel can be used for detecting the rotational speed of the electric machine.

The electric machine preferably has a sensor device for detecting a rotational speed of the rotor. Thus, the fan wheel accomplishes two objectives, namely cooling the electric machine and detecting the rotational speed of the rotor.

The sensor device of the electric machine preferably has a sensor arranged radially outside the fan wheel. The sensor advantageously is an inductive sensor.

Air-guiding elements of the fan wheel preferably constitute signal transmitters of the sensor device. Thus, no additional elements are required for producing the signal transmitters.

The fan wheel preferably has two supporting rings connected integrally to each other by air-guiding elements, such as air-guiding vanes.

The supporting rings preferably have identical inside diameters and/or identical outside diameters. Thus, the production of the fan wheel is simplified.

One of the supporting rings may have through holes for receiving fastening elements to couple the fan wheel to the rotor. The fastening elements may be screws and the through holes may be bores that are accessible during installation of the fan wheel. The fastening elements may be screwed into blind threaded holes in the rotor.

The invention also relates to a motor vehicle with the above-described electric machine. The motor vehicle is, for example, an electric vehicle or a hybrid vehicle. The electric machine here serves entirely or partially for driving the motor vehicle.

The invention further relates to a method for operating an electric machine of this type. The fan wheel advantageously functions for cooling and interacts with an inductive sensor for detecting the rotational speed of the rotor of the electric machine.

Further features of the invention emerge from the description below, in which various exemplary embodiments are described in detail with reference to the drawing.

DETAILED DESCRIPTION OF THE PREFERRED EMBODIMENTS

Figure 1:
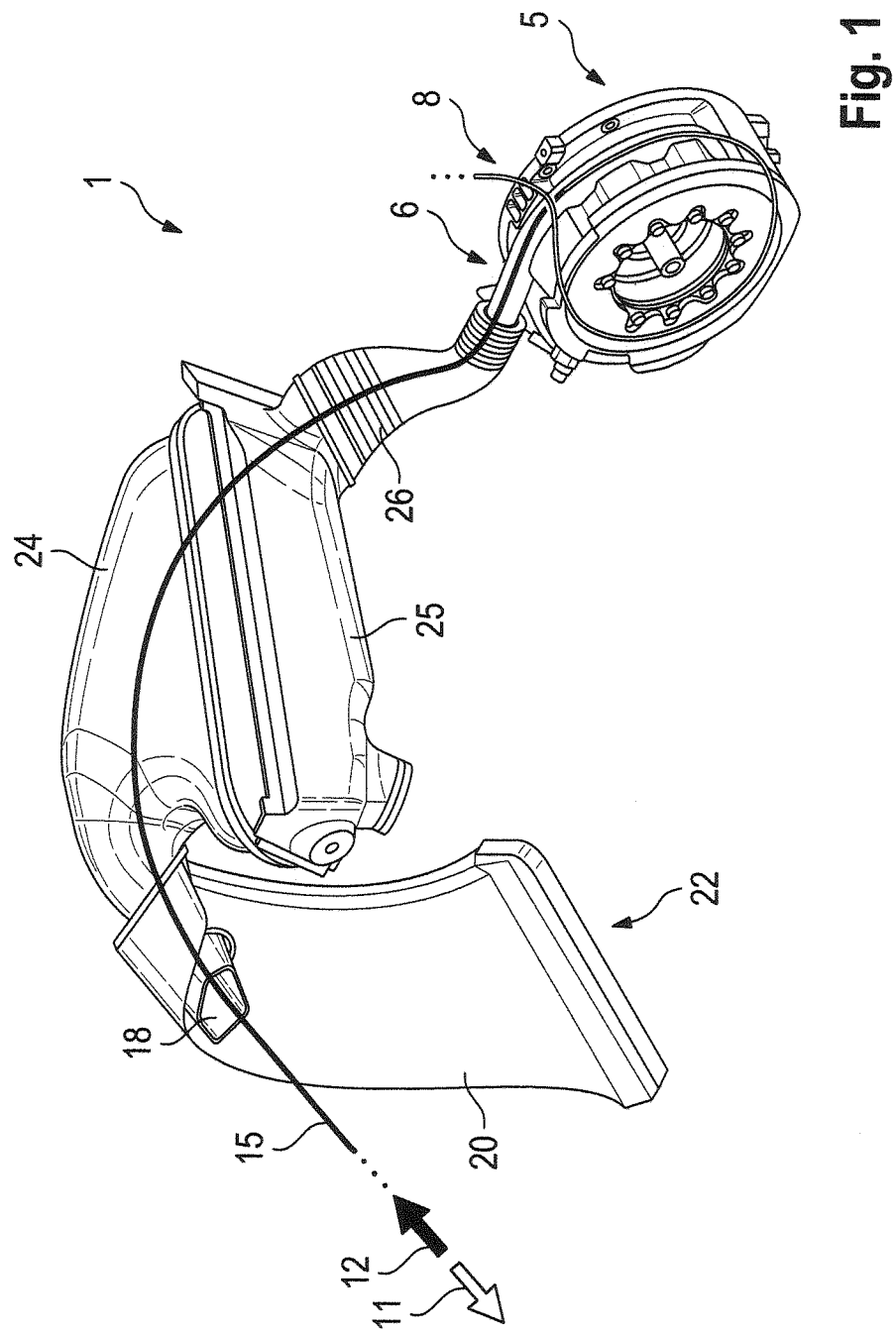
FIG. 1 is a simplified perspective illustration of a motor vehicle with an electric machine that is supplied with air for cooling purposes.

FIG. 1 perspectively illustrates a cooling device 1 for cooling an electric machine 5 with cooling air. The cooling air is supplied to the electric machine 5 via an air inlet 6. The cooling air is heated during operation of the electric machine 5 and the heated cooling air emerges from the electric machine at an air outlet 8.

The electric machine 5 advantageously is equipped with a rotating fan wheel, with the aid of which the cooling air can be sucked via the air inlet 6. An arrow 11 indicates a direction of travel of a motor vehicle 22 equipped with the cooling device 1. Relative wind supplied to the air inlet 6 in the form of an air flow 15 is indicated by a further arrow 12.

The air flow 15 passes through an air inlet opening 18 in or on a bodywork part 20 of the motor vehicle 22 and into an air box 24. From the air box 24, the air flow passes via a clean air shell 25 and a cooling-air connection 26 to the air inlet 8 of the electric machine 5.

A fan wheel of the electric machine 5 constitutes an active flow element and can be used as an alternative or in addition to the relative wind 12 for producing the cooling of the air. The relative wind 12 results in the production at the air inlet opening 18 of a positive pressure or dynamic pressure, the influence of which is transmitted to the air box 24 and to the clean air shell 25.

The cooling-air connection 26 advantageously is formed from an elastomer to decouple drive train vibrations and relative movements from the bodywork of the motor vehicle 22. As an alternative, the cooling-air connection 26 can comprise piping, for example made of an elastomer/fabric compound, or a corrugated or flexible pipe.

Figure 2:
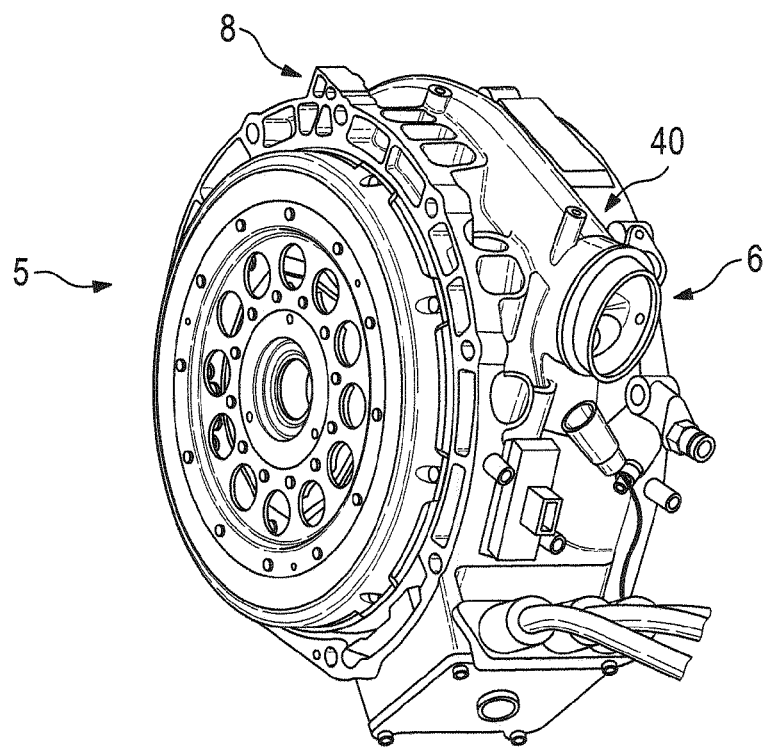
FIG. 2 is an enlarged rotated illustration of the electric machine from FIG. 1.
Figure 3:
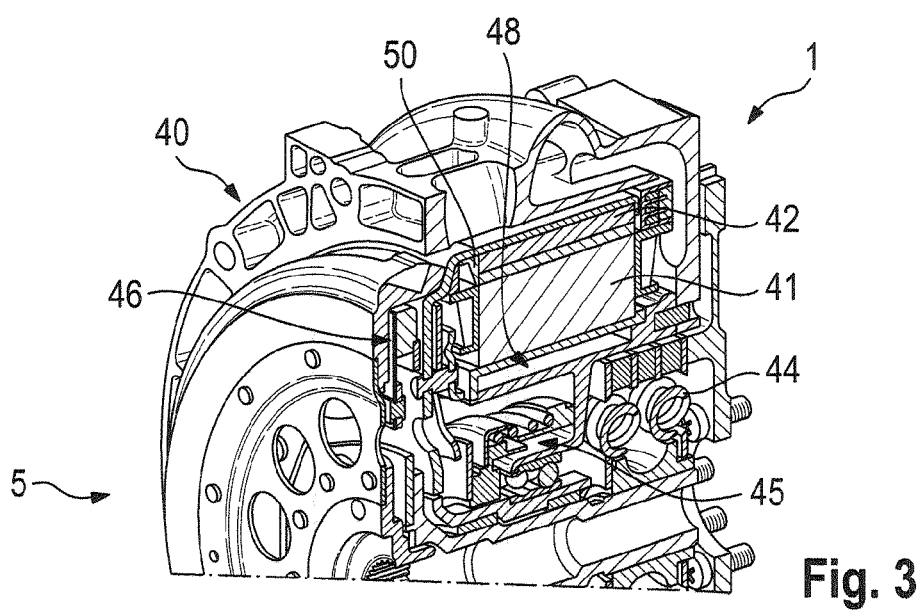
FIG. 3 is a perspective sectional illustration of the electric machine of FIG. 2.

As shown in FIGS. 2 and 3, the electric machine 5 comprises a housing 40 with the air inlet 6 and the air outlet 8. A stator 41 and a rotor 42 are arranged in the housing 40. The rotor 42 is arranged radially outside the stator 41. A torsional vibration damper 44 and a disengaging device 45 are arranged radially within the stator 41. The disengaging device 45 actuates a separating coupling 46 that is integrated into the housing 40 of the electric machine 5.

The cooling device 1 of the electric machine 5 comprises a water-cooling means 48 which comprises, for example, a water jacket arranged radially within the stator 41. The air-cooling means comprises a fan wheel 50, which, in the exemplary embodiment illustrated, is connected to the rotor 42 of the electric machine 5 for conjoint rotation.

Figure 4:
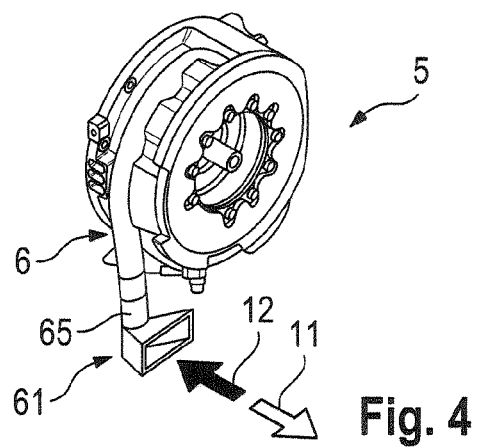
FIGS. 4 to 6 show similar illustrations of the electric machine from FIG. 2 with different air supply devices.
Figure 5:
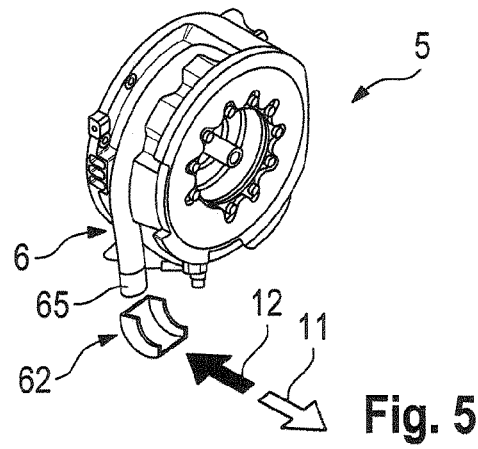
Figure 6:
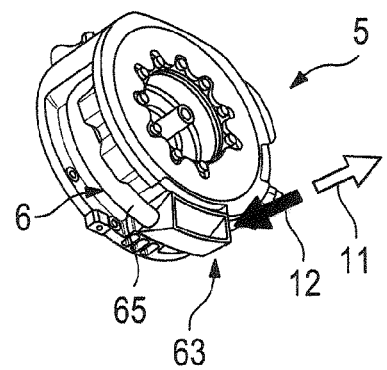

FIGS. 4 to 6 illustrate how relative wind 12 can be supplied to the housing 40 of the electric machine 5 with the aid of various air supply devices 61, 62, 63. The arrow 11 here, as in the exemplary embodiment illustrated in FIG. 1, in each case represents the direction of travel. The arrow 12 symbolizes the relative wind. The air supply devices 61 to 63 are connected to the air inlet 6 on the electric machine 5 via flexible or rigid air-connecting lines 65.

The air supply device 61 illustrated in FIG. 4 constitutes a type of funnel that is open toward the relative wind 12. The air supply device 61 is integrated, for example, into the bodywork of a motor vehicle equipped with the electric machine 5.

The air supply device 62 of FIG. 5 is designed as a spoiler, by means of which the relative wind 12 is deflected by approximately 90 degrees. The air supply device 62 likewise advantageously is integrated into the bodywork of the motor vehicle.

The air supply device 63 illustrated in FIG. 6 is substantially a funnel and is integrated into the housing 40 of the electric machine 5. The air supply device 63 advantageously can be pivotable. This affords the advantage that the air supply device 63 can be adapted rapidly and simply to different mounting positions.

If there is a difference in speed between the motor vehicle and the surrounding air, the air flow, indicated by the arrow 12, approaching the vehicle is produced by the relative wind. A significant contribution to the mass flow of cooling air can be achieved by using the approaching air flow. This effect can be used separately or in addition to further active flow elements.

Figure 7:
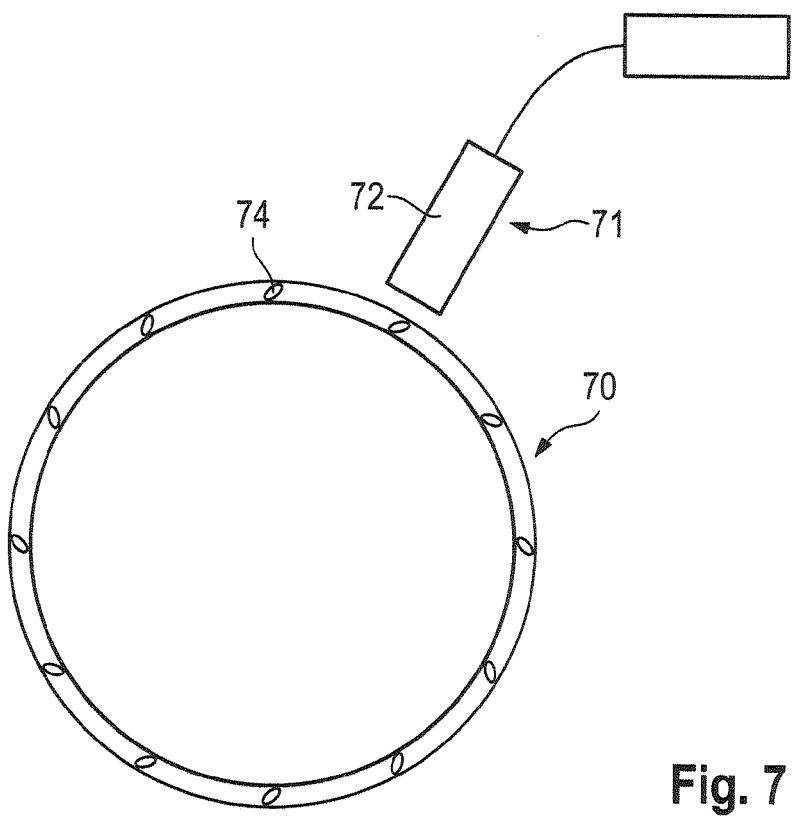
FIG. 7 is a simplified illustration of a fan wheel of the electric machine according to the invention with a sensor device.

FIG. 7 illustrates a fan wheel 70 of the above-described electric machine by itself in detail. According to an essential aspect of the invention, the fan wheel 70 is assigned a sensor device 71. The sensor device 71 comprises an inductive sensor 72.

Air-guiding elements 74 of the fan wheel 70 constitute signal transmitters of the sensor device 71. The sensor device 71 is connected to a motor control system 75 via a control line 73. The inductive sensor 72 is arranged radially outside the fan wheel 70.

The fan wheel 70 with the air-guiding elements 74 is formed from steel and, particularly advantageously, permits detection of the rotational speed of the electric machine.

Figure 8:
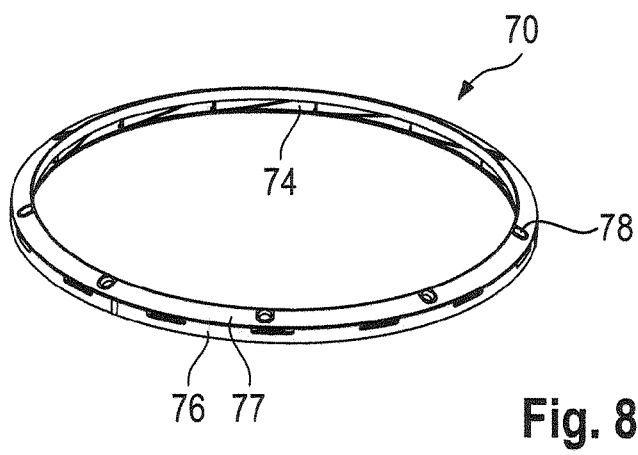
FIG. 8 shows a perspective illustration of the fan wheel from FIG. 7.

FIG. 8 illustrates the fan wheel 70 perspectively. The fan wheel 70 comprises two supporting rings 76, 77 that are connected integrally to each other by the air-guiding elements 74. The supporting rings 76, 77 have essentially identical inside diameters and identical outside diameters. Through holes 78 permitting fastening of the fan wheel 70 to the rotor of the electric machine are made in the supporting ring 77.

What is claimed is:

1. An electric machine supplied with air for cooling, the air being heated during operation of the electric machine and being removed as exhaust air, comprising:
   a rotor;
   a fan wheel coupled to the rotor, the fan wheel being a precise metal part and having first and second supporting rings connected to one another, one of the first and second supporting rings having through holes for passage of fastening elements, with which the fan wheel is coupleable to the rotor, and circumferentially spaced air guiding elements formed from steel and extending between the first and second supporting rings and the air guiding elements being configured for transmitting cooling air to the electric machine; and
   an inductive sensor device opposed to the air guiding elements and configured for receiving signals transmitted from the air-guiding elements to determine the rotational speed of the electric machine.

2. The electric machine of claim 1, wherein the sensor device has a sensor arranged radially outside the fan wheel.

3. A motor vehicle with the electric machine of claim 1.

4. The electric machine of claim 1, wherein the fan wheel is a steel part.

5. An electric machine supplied with air for cooling, the air being heated during operation of the electric machine and being removed as exhaust air, comprising:
   a rotor;
   a fan wheel coupled to the rotor, the fan wheel being a precise metal part and having first and second supporting rings connected to one another, the first and second supporting rings having identical inside diameters and/or identical outside diameters, and circumferentially spaced air guiding elements formed from steel and extending between the first and second supporting rings and the air guiding elements being configured for transmitting cooling air to the electric machine; and
   an inductive sensor device opposed to the air guiding elements and configured for receiving signals transmitted from the air-guiding elements to determine the rotational speed of the electric machine.

6. The electric machine of claim 5, wherein one of the first and second supporting rings has through holes for the passage of fastening elements, with which the fan wheel is coupleable to the rotor.

7. A motor vehicle having an electric machine supplied with air for cooling, the air being heated during operation of the electric machine and being removed as exhaust air, the motor vehicle comprising:
   an exterior vehicle surface;
   an electric machine housing having an air inlet and an air outlet;
   a rotor disposed in the electric machine housing;
   a fan wheel defining a precise metal part having first and second supporting rings connected to one another, one of the first and second supporting rings having through holes for passage of fastening elements that couple the fan wheel to the rotor, and air guiding elements formed between the first and second supporting rings and configured for transmitting cooling air to the electric machine;
   a sensor device configured for receiving signals transmitted from the air-guiding elements to determine the rotational speed of the electric machine; and
   an air inlet opening formed on the exterior vehicle surface and open towards a direction of travel of the motor vehicle, the air inlet opening communication with the air inlet of the electric machine housing to convey air for cooling to the electric machine.

* * * * *